(12) United States Patent
Wang et al.

(10) Patent No.: US 10,887,056 B2
(45) Date of Patent: Jan. 5, 2021

(54) HIGHLY RELIABLE HYBRID AUTOMATIC REPEAT REQUEST TECHNOLOGIES FOR NEW RADIO SIDELINK

(71) Applicant: AT&T Intellectual Property I, L.P., Atlanta, GA (US)

(72) Inventors: Xiaoyi Wang, Austin, TX (US); Salam Akoum, Austin, TX (US); Milap Majmundar, Austin, TX (US); Thomas Novlan, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/402,778

(22) Filed: May 3, 2019

(65) Prior Publication Data

US 2020/0351028 A1     Nov. 5, 2020

(51) Int. Cl.
| | |
|---|---|
| *H04L 1/18* | (2006.01) |
| *H04W 72/04* | (2009.01) |
| *H04W 72/12* | (2009.01) |
| *H04L 5/00* | (2006.01) |

(52) U.S. Cl.
CPC .......... *H04L 1/1816* (2013.01); *H04L 5/0055* (2013.01); *H04W 72/042* (2013.01); *H04W 72/1231* (2013.01)

(58) Field of Classification Search
CPC ............... H04L 1/1816; H04L 5/0055; H04W 72/1231; H04W 72/04; H04W 72/12; H04W 76/00; H04B 7/2121; H04B 7/2123; H04J 2203/0069; H04Q 2213/394
See application file for complete search history.

(56) References Cited

U.S. PATENT DOCUMENTS

| | | | |
|---|---|---|---|
| 9,461,800 B2 * | 10/2016 | Vrzic | H04L 1/1867 |
| 10,667,119 B2 * | 5/2020 | Loehr | H04W 8/005 |
| 2008/0137564 A1 * | 6/2008 | Herrmann | H04L 1/1887 370/310 |
| 2017/0353971 A1 * | 12/2017 | Gupta | H04W 72/14 |

* cited by examiner

*Primary Examiner* — Sharad Rampuria
(74) *Attorney, Agent, or Firm* — Amin, Turocy & Watson, LLP

(57) ABSTRACT

The disclosed subject matter is directed towards highly reliable Hybrid Automatic Repeat Request (HARQ) retransmission procedures, including to provide different levels of reliability for Sidelink transmissions. A scheduler node schedule a data transmission by a transmitter node, and can receive (and store) the data packet transmission. If the scheduler node receives a negative acknowledgement (NAK) from the receiver node, the scheduler node can allocate resources to the transmitter node to perform a retransmission of the data packet, and/or retransmit a copy of the data packet from the scheduler node to the receiver node. The scheduler node can inform the receiver node that a retransmission is being sent by the transmitter node and the scheduler node.

20 Claims, 11 Drawing Sheets

HIGHLY RELIABLE HYBRID AUTOMATIC REPEAT REQUEST TECHNOLOGIES FOR NEW RADIO SIDELINK

TECHNICAL FIELD

The subject application is related to wireless communication systems, and, for example, to fifth generation (5G, sometimes referred to as New Radio (NR)) cellular wireless communications systems in which sidelink communications are in use.

BACKGROUND

Vehicle to everything (V2X) services can comprise vehicle-to-infrastructure (V2I) communications between vehicles and base stations (e.g. gNodeBs) or roadside access point units, and vehicle-to-vehicle (V2V) communications which may be over the existing cellular (Uu) interface or a Sidelink (e.g. D2D or PC5) interface.

Sidelink resource allocation can operate by having the base station perform resource allocation and feedback using cellular Uu signaling and protocols (referred to as Mode 1 in the 3GPP standard). The base station sends a downlink control message (DCI) to the transmitting V2X user equipment (referred to as Node-T) indicating the Sidelink resources that can be used. The Node-T then sends a Sidelink control information (SCI) message along with the broadcast/groupcast/unicast data to the receiving V2X user equipment(s) (referred to as Node-R). Based on whether the reception of the data was successful or not, the Node-R sends ACK/NACK feedback to the base station using an uplink control message (UCI), which is used to manage subsequent resource allocation decisions.

Another type of Sidelink resource allocation has a V2X user equipment schedule a Node-T to Node-R transmission (other instead of a base station or other infrastructure node (termed Mode 2D in 3GPP). To achieve the resulting three-party communication system, a UE can be appointed as a V2X local manager (sometimes referred to as a scheduler Node-S), which coordinates the resources used by the associated transmitting user equipment (Node-T) and receiving user equipment(s) (Node-R).

Both Mode-1 and Mode-2D have advantages in terms of network control and overhead, respectively. However, Sidelink communications sometimes collide, resulting in the receiver node being unable to properly decode a data packet.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
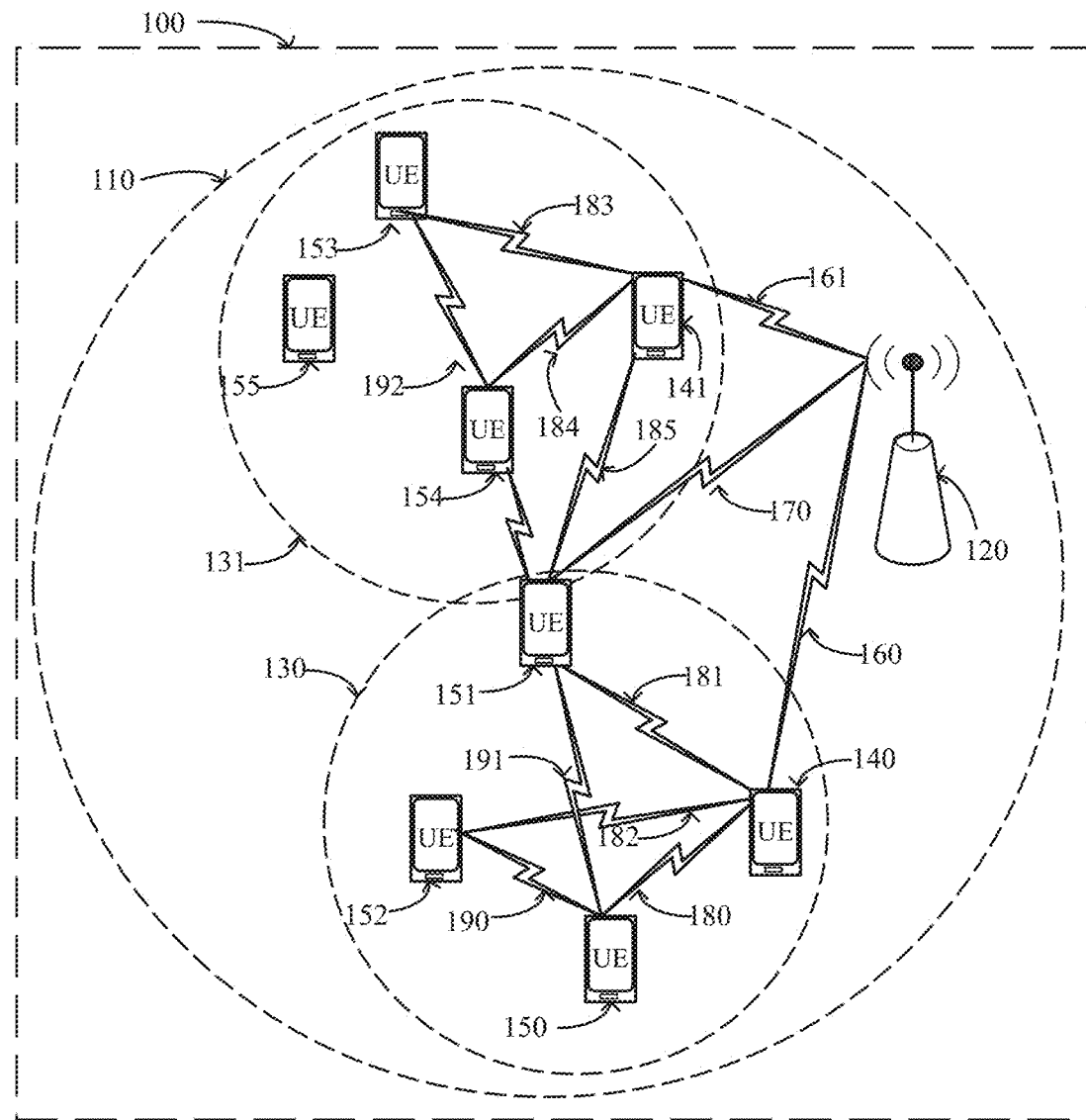
FIG. 1 illustrates an example wireless three-party communication system including scheduling nodes, transmitting nodes and receiving nodes that can communicate via Sidelink transmissions, in accordance with various aspects and embodiments of the subject disclosure.

The technology described herein facilitates highly reliable Hybrid Automatic Repeat Request (HARQ) retransmission procedures, including to provide different levels of reliability for Sidelink transmissions. To this end, device and signaling operations are provided that enable configuration of Sidelink HARQ feedback types. For example, instead of semi-static configurations, described herein is a technology for the network to more dynamically control resource allocation decisions made by the local manager, e.g., using a network-assisted approach. In one aspect, this includes the configuration of HARQ feedback between the scheduling and/or transmitting nodes(s), that is, the scheduler node can determine the reliability of HARQ retransmission in a dynamic manner.

For example, the scheduler node can receive (and store) a data packet transmission from the transmitter node that is intended to be received by the receiver node. If the scheduler node receives a negative acknowledgement (NAK) from the receiver node, the scheduler node can allocate resources to the transmitter node to perform a retransmission of the data packet, as well as retransmit a copy of the data packet from the scheduler node to the receiver node. Other alternatives are described herein, e.g., the scheduler node can retransmit the data packet copy to the receiver node, but without also having the transmitter node retransmit the data packet; the scheduler node can schedule another node to retransmit the data packet, and so on.

Depending on latency requirements and/or quality of service (QoS) requirements, a scheduler node may choose to activate highly-reliable HARQ retransmission for a second or third retransmission of a data packet, and so on. Note that in one implementation, highly reliable HARQ retransmission can be disabled at any time; for example, when the traffic load is too high, a scheduler may use the retransmission resources for other communications by disabling highly-reliable HARQ retransmissions when needed.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

As exemplified in FIG. 1, a wireless cellular communications system 100 is depicted. A base station 120 provides coverage in geographic area 110 comprising the cell. Air interfaces 160, 161, 170 provide downlink and uplink communication links for UEs 140, 141, 150, respectively. Note that all UEs 140, 141, 150, 151, 152, 153, 154, 155 can be assumed to have uplink/downlink communication links with base station 120, although this is not expressly depicted in FIG. 1 for purposes of readability.

Air interfaces 180, 181, 182, 183, 184, 185, 190, 191, 192 provide sidelink connectivity between two given UEs. A local manager, referred to herein as Node-S, locally controls transmissions on the Sidelink within an area (or other grouping) associated with the Node-S. In the example of FIG. 1, a Node-S 140 controls Sidelink transmissions in area 101, and a Node-S 141 controls Sidelink transmissions in area 131. In general, a Node-S, such as the Node-S 140, sends common downlink control information (DCI) to a transmitting node (Node-T, such as the node 150) and the receiving node(s), i.e., one or more Node-R(s), such as the node 152. Transmission and reception thus occurs on the Sidelink between a plurality of UEs.

Described herein is a technology that, upon receipt of a negative acknowledgement from the Node-R, lets the Node-S retransmit the data instead of or in addition to scheduling a node-T to perform a retransmission. Note that in other technologies, the Node-S is not involved in retransmission schemes.

In one embodiment, a common downlink control information is sent to the transmitting (Node-T) and receiving (Node-R) nodes. For example, the Node-S 140 may send downlink control information to the nodes 150, 151, 152 via the Sidelinks 180, 181, 182, whereby Node-T 150 subsequently sends data to nodes 151 and 152 via the Sidelinks 190, 191. The nodes 151 and 152 in this example are each referred to as a Node-R, because the Node-T 150 in this example transmits to a plurality of Node-Rs; this scenario is called the broadcast or multicast scenario. In another example, the Node-S 141 may send downlink control information to the nodes 153, 154 via Sidelinks 183,184 whereby the Node-T 153 subsequently sends data to the Node-R 154 via Sidelink 192, e.g., in a unicast transmission.

Note that in this example, the local manager nodes 140, 141, namely the Node-S 140 and the Node-S 141 in the system 100 are configured to be local managers by the base station 120 via links 160, 161, whereby any node can transmit or receive via a Sidelink controlled by at least one Node-S. Hence, whether a node is transmitting (in the Node-T state) or receiving (in the Node-R state) is dynamically controlled by a Node-S, based on the downlink control information. Note that it is feasible for a Node-S to be elected as a local (group) manager by a group of user equipment nodes without a base station configuration, at least temporarily.

Figure 2:
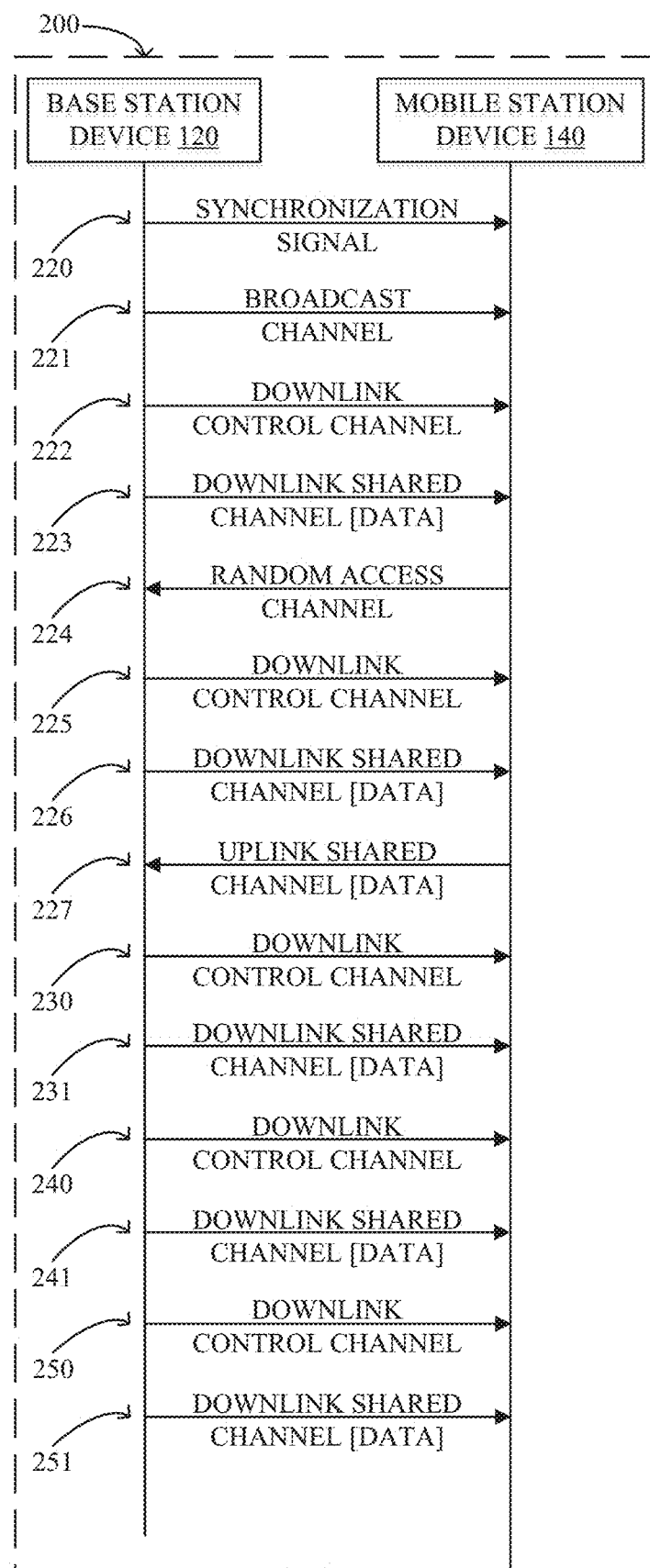
FIG. 2 illustrates an example timing diagram showing communications between a base station and a mobile station device, such as a local manager device, in accordance with various aspects and embodiments of the subject disclosure.

Now referring to FIG. 2, a UE 140 may receive a synchronization signal 220 from a base station 120. The synchronization signal allows the UE 140 to become time and frequency synchronized with base station 120 such that UE 140 can receive waveforms carrying information from base station 120. The synchronization signal may also convey information needed to receive the broadcast channel in 221. Amongst other data, information carried on the broadcast channel configures the UE to receive a downlink control channel 222 for scheduling a downlink shared channel 223. Data transmitted via the downlink shared channel configures the UE to initiate a random access procedure by transmitting a random access channel in 224. The base station schedules a random access response by means of a downlink control channel 225 carried on another downlink shared channel 226. The random access response contains a scheduling assignment and a timing advance for the UE to transmit the first uplink shared channel transmission in 227. The uplink shared channel conveys a user ID. In case of contention resolution during the random access procedure, base station 120 schedules another downlink control channel 230 scheduling a downlink shared channel 231 to resolve contention. Yet another downlink control channel 240 schedules a downlink shared channel 241 to initiate configuration of UE 140 for communication with base station 120. Once UE 140 is fully configured for bi-directional and secure communication with base station 120 via air interface 160, base station 120 sends yet another downlink control channel 250 scheduling a downlink shared channel 251 to initiate configuration of UE 140 as a Node-S.

In one or more implementations, base station 120 configures each Node-S 140, 141 with orthogonal resource pools. Resources are defined in the time and frequency domain. For example, in a wireless communications system employing orthogonal frequency-division multiple access (OFDMA) different Node-S may be assigned different sub-carrier indices (frequency domain) and OFDM symbols (time domain) for data transmission. Similarly, the same or different subcarrier indices and OFDM symbols may be configured for control channel transmissions. For control channel transmissions, however, identical time/frequency resources can be configured for multiple Node-Ss, whereby each Node-S is assigned a different search space for control channel transmissions within the identical time/frequency resources. Additional resources may be configured by base station 120 for each Node-S 140, 141, e.g., for physical random access channel (PRACH) and physical uplink control channel (PUCCH) transmissions. These may be used by a Node-S to send scheduling requests or other uplink control information (UCI) such as channel state information (CSI) feedback or HARQ acknowledgements.

Similarly, the base station 120 configures UEs 150, 151, 152, 153, 154, 155 for communication via Sidelinks. Unlike Node-S UEs, which are configured by base station 120 as a Node-S via dedicated signaling (e.g. to configure the orthogonal resource pools and search spaces), UEs that transmit and receive via a Sidelink but are not configured as a local manager/Node-S—that is, these nodes are controlled by a Node-S rather than being configured as one—can be configured for Sidelink communication under the control of a local manager via common signaling. In particular, a given node that is not a Node-S is aware of the resource pools of the Node-S within cell 110. In one embodiment, these nodes are configured by common broadcast signaling from the base station 120, however, configuration by dedicated messages is not precluded. For example, Sidelink information including the resource pools of all Node-S in 110 can be included as part of the radio resource control (RRC) setup or reconfiguration of a node 150, 151, 152, 153, 154, 155. Because a given node that is not a Node-S is aware of the resource pools of the one or more Node-S in 110, such a node can receive downlink control information from one or more Node-S in its proximity. This is illustrated in FIG. 1 for UE 151, which can receive from a first Node-S 140 via a first Sidelink 181 and from a second Node-S 141 via a second Sidelink 185, respectively.

As mentioned herein, the nodes 150, 151, 152, 153, 154, 155 are configured to receive from the Node-S 140, 141 by base station 120. Hence, when monitoring for downlink control information, a given node 150, 151, 152, 153, 154, 155 potentially can receive downlink control information from multiple Node-Ss. This allows for a seamless transition between a local area 130 controlled by a first local manager Node-S 140 and a local area 131 controlled by a second local manager Node-S 141. In particular, such a transition does not require a handover or any other signaling from base station 120.

Unlike traditional D2D or vehicle-to-vehicle (V2V) communications systems, which deal with pairs of nodes, in which for a given node the Sidelink control channel and the Sidelink data channel transmissions occur between the same pair of nodes, in one or more embodiments described herein, downlink control information is transmitted by a Node-S and data is transmitted by a Node-T and received by a Node-R. Generally, Node-S, Node-T, and Node-R are three distinct nodes, however, a scenario in which a Node-S also acts as a transmitter Node-T are not precluded. Furthermore, as discussed herein, whether a node acts as transmitter (Node-T) or receiver (node-R) is generally controlled by the Node-S, depending on whether the downlink control information sent by Node-S and received by a given node instructs the receiving node to transmit (in which case it acts as Node-T) or to receive (in which case it acts as Node-R).

Figure 3:
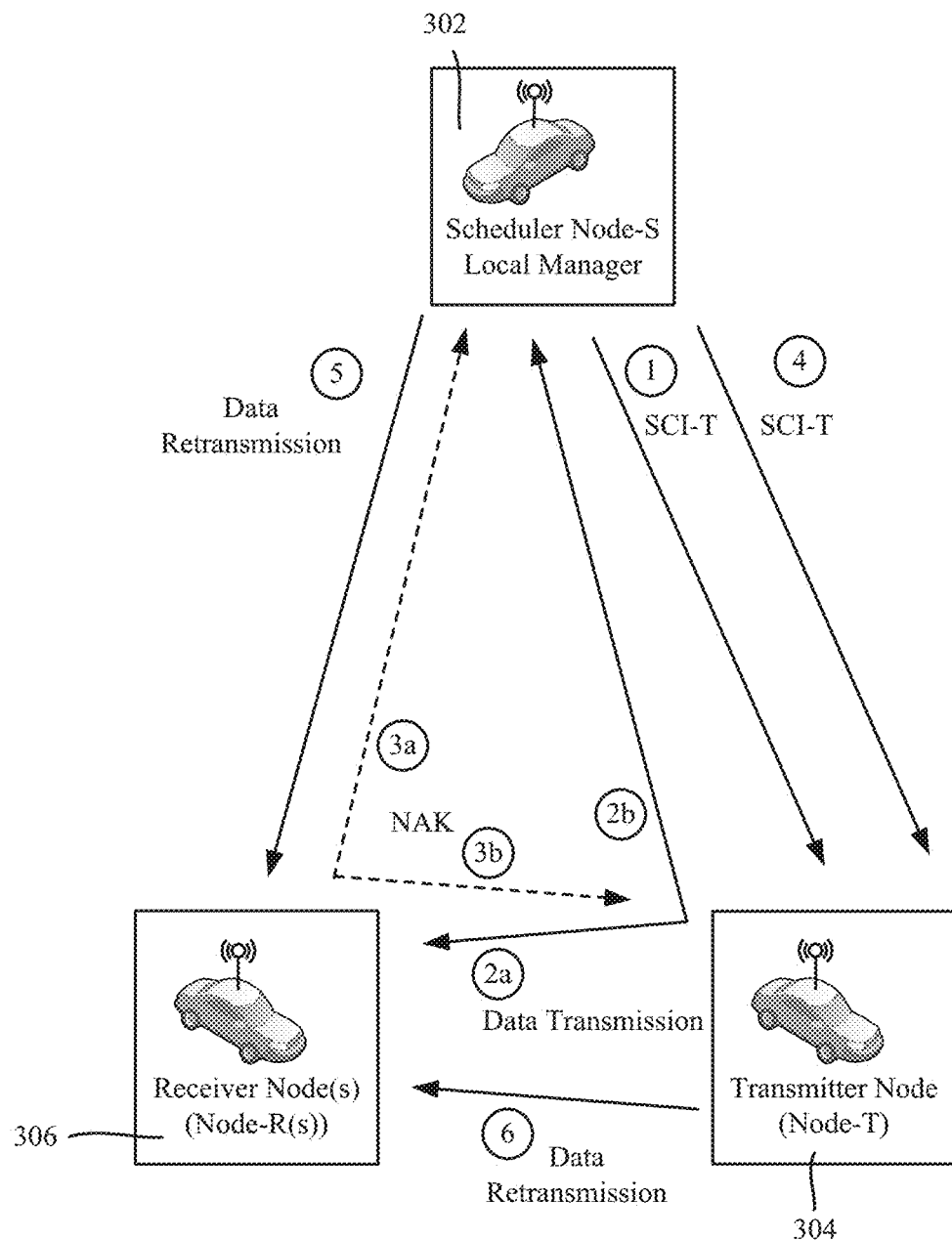
FIG. 3 is an example block diagram representing a scheduler node (local manager device) and a transmitter node retransmitting data to a receiver node, in accordance with various aspects and embodiments of the subject disclosure.

Turning to aspects related to retransmission in response to receipt of a HARQ negative acknowledgement from a receiver node(s), FIG. 3 shows one alternative, which for simplicity as described herein is based on one unicast receiver node in this example, (although as is understood it is straightforward to have more than one receiver node in the scenario). In general, as represented by arrow one (1), the scheduler node-S 302 assigns, via Sidelink control information (SCI-T) resources for a transmitter node-T 304 to send a new data packet to a receiver node 306; this includes the physical time/frequency resources (e.g. PRB(s)) and/or MCS, Rank, etc. Note that alternatively the resources can be semi-statically assigned. Note that downlink control information or DCI, when used in a Sidelink-related environment, such as with a Node-S, a Node-T and a Node-R, can be alternatively referred to as "Sidelink Control Information" (or "SCI"), e.g., as referred to in RAN1 (Radio Access Network Layer 1) specification(s).

At the scheduled time, the transmitter node-T 304 transmits the data packet to the receiver node 305 (arrow 2a); the scheduler node also receives the data packet on the assigned resource (arrow 2b), via a Physical Sidelink Shared Channel (PSSCH). Note that the scheduler node 302 may or may not decode the data packet. If not decoded, the scheduler node 302 may keep the soft symbol (before decoding) in a memory for possible later retransmission. The scheduler node can also decide to decode the data packet, not necessarily right away, but if needed for retransmission. As used herein, the term "copy" with respect to a data packet can be a non-decoded packet copy, or a decoded copy.

As represented via the arrow labeled (3a), the scheduler node receives the HARQ feedback information from the receiver via the Physical Sidelink Feedback Channel (PSFCH). Note that the transmitter node can also receive the HARQ feedback information (arrow (3b)).

In this example, consider that a NAK is received. In this event, the scheduler node 302 may allocate additional resource(s) for the transmitter to perform one or more re-transmission(s), e.g., via another SCI-T communication represented by arrow (4) in FIG. 3.

As described herein, on the allocated resource, as represented by the arrow labeled (5), the scheduler node-S 302 also retransmits the data packet that was previously received (arrow (2)). From the receiver's point of view, the receiver node 306 can receive the data packet retransmitted from both the transmitter node 304 (arrow (6)) and the scheduler node 304 (arrow (5)) as a single data packet, in a transparent manner Basically, the scheduler node 302 acts as a repeater in this scenario.

Optionally, the scheduler node may send a control signaling (e.g. in the SCI at arrow (4)) to inform the receiver node 306 that the re-transmission data packet is scheduled to arrive from two nodes. In this way, the receiver node 306 can prepare its channel estimation accordingly. In this case the receiver may also adapt its ACK/NAK and/or CSI feedback to indicate different estimated reliability data of the different transmission sources.

Figure 4:
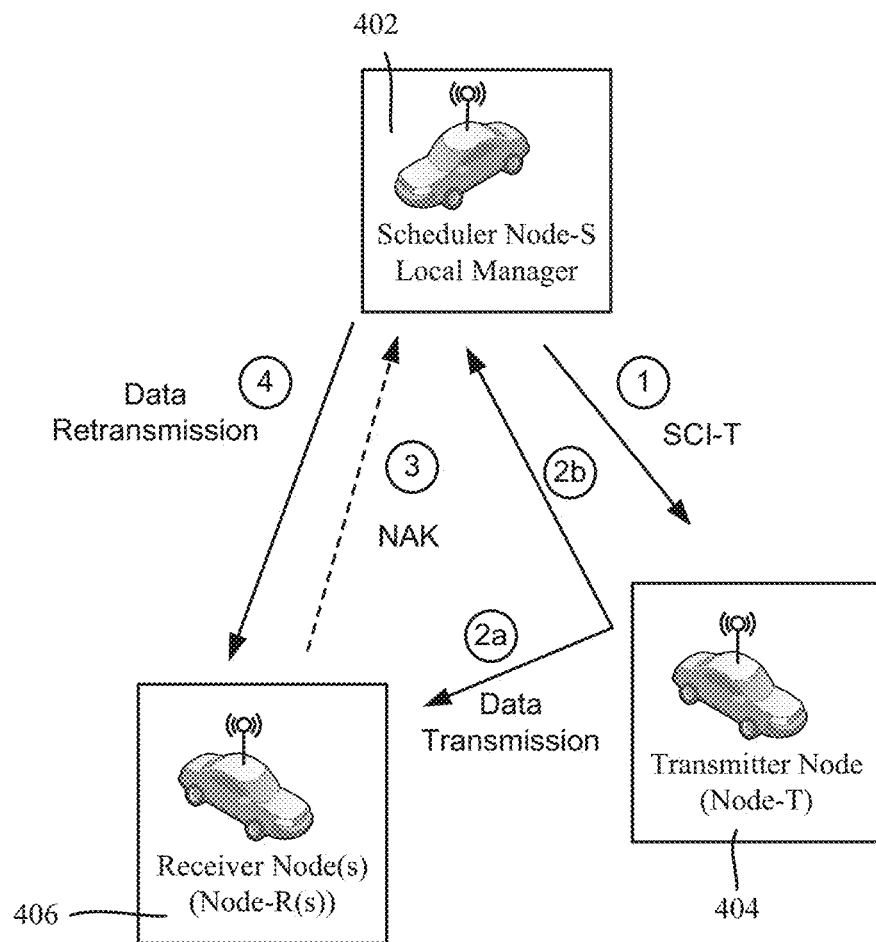
FIG. 4 is an example block diagram representing a scheduler node (local manager device) retransmitting data to a receiver node, in accordance with various aspects and embodiments of the subject disclosure.

In one alternative generally represented in FIG. 4, a scheduler node 402 may decide (in view of a NAK, arrow 3) to send a retransmission to a receiver node 406, but not indicate to a transmitter node 404 (that originally sent the data packet) to send the retransmission. Note that a scheduler node 402 also can select an entirely different transmitter node to send a retransmission. Effectively the scheduler node 402 selects which nodes (or combination of nodes) can transmit the retransmitted data packet on the allocated resource(s) for retransmission(s).

In addition, the scheduler may determine which node (transmitter, scheduler) to transmit which redundant version of the same transmission block to achieve spatial diversion in decoding. For example, the scheduler node 402 can decode the original data transmission and, (instead of acting as a repeater), send a different redundancy version of the data to the receiver node 406.

Thus, the selection of a given retransmission approach can be decided for an individual data packet (e.g. the same approach is used for all transmissions of the given HARQ process) or can be selected on an individual transmission block-basis (e.g. different HARQ redundancy versions can have different transmission approaches).

Moreover, the determination of which retransmission scheme can be based on the reported CSI (channel state information) or RSSP (reference signal received power) on each link. The selection can also consider factors such as QoS type for the traffic, the buffer status and the system load.

By way of example, consider that a first data packet is related to public safety-related data traffic. In such an event, the scheduler can select that both scheduler and transmitter to perform the retransmission. Conversely, if a second data packet is regular mobile broadband traffic, then the scheduler node may determine that that only the transmitter node is to be selected for the retransmission.

In another example scenario, consider that when a data packet needs retransmission, the scheduler node evaluates the RSRP or CSI report on the link between the receiver node and the scheduler node, as well as the link between the receiver node and the transmitter node. If the link between the receiver node and the transmitter node is significantly better, (e.g., based on some threshold difference, the scheduler node selects the transmitter node to do the retransmission. If the link between the receiver node and the scheduler node is significantly better, (e.g., based on some threshold difference, the scheduler node determines that the scheduler node to do the retransmission (and possibly the transmitter node as well).

In another example, consider that the scheduler node does not receive the ACK/NAK from the receiver node, e.g., the receiver node has moved out of range. The transmitter node can unilaterally decide to retransmit, or can communicate with the scheduler node to inform the scheduler node of the ACK/NAK. If a NAK, the scheduler node can make the determination how to proceed, e.g., to have the transmitter node and/or another transmitter node attempt the retransmission.

Figure 5:
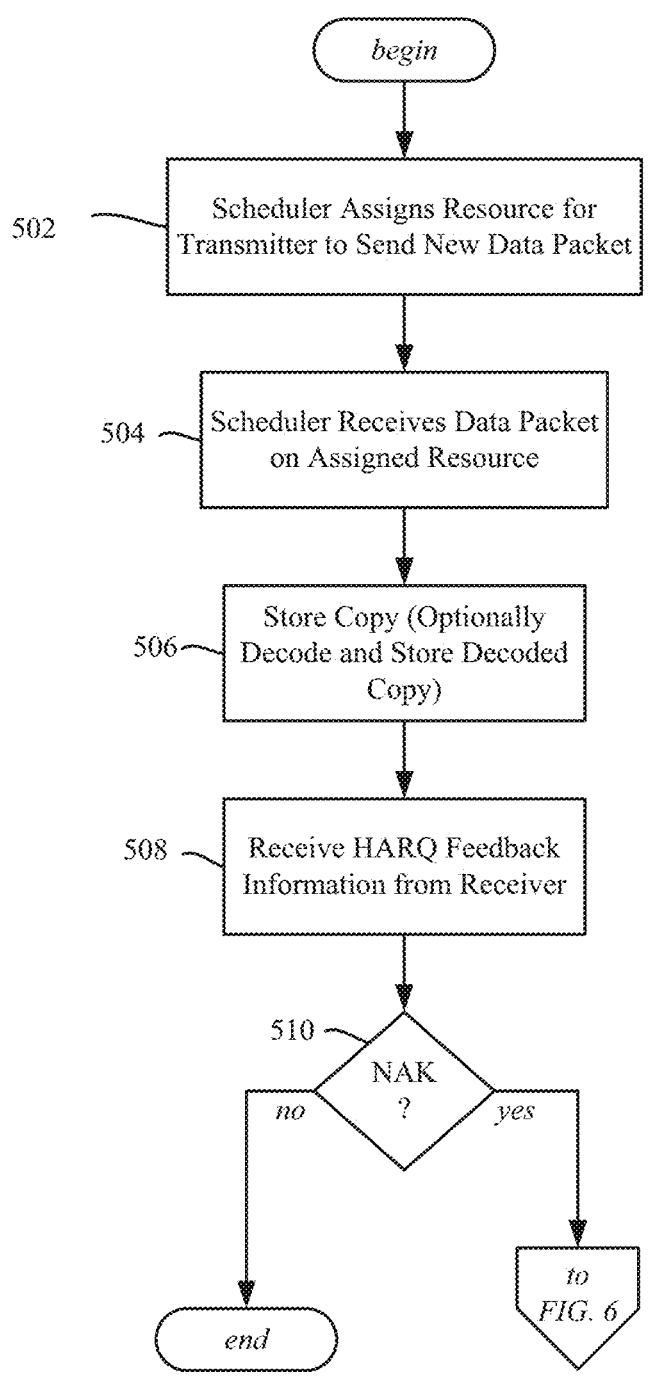
FIGS. 5 and 6 comprises a flow diagram representing example operations of a scheduler node with respect to handling a HARQ NAK (negative acknowledgement), in accordance with various aspects and embodiments of the subject disclosure.
Figure 6:
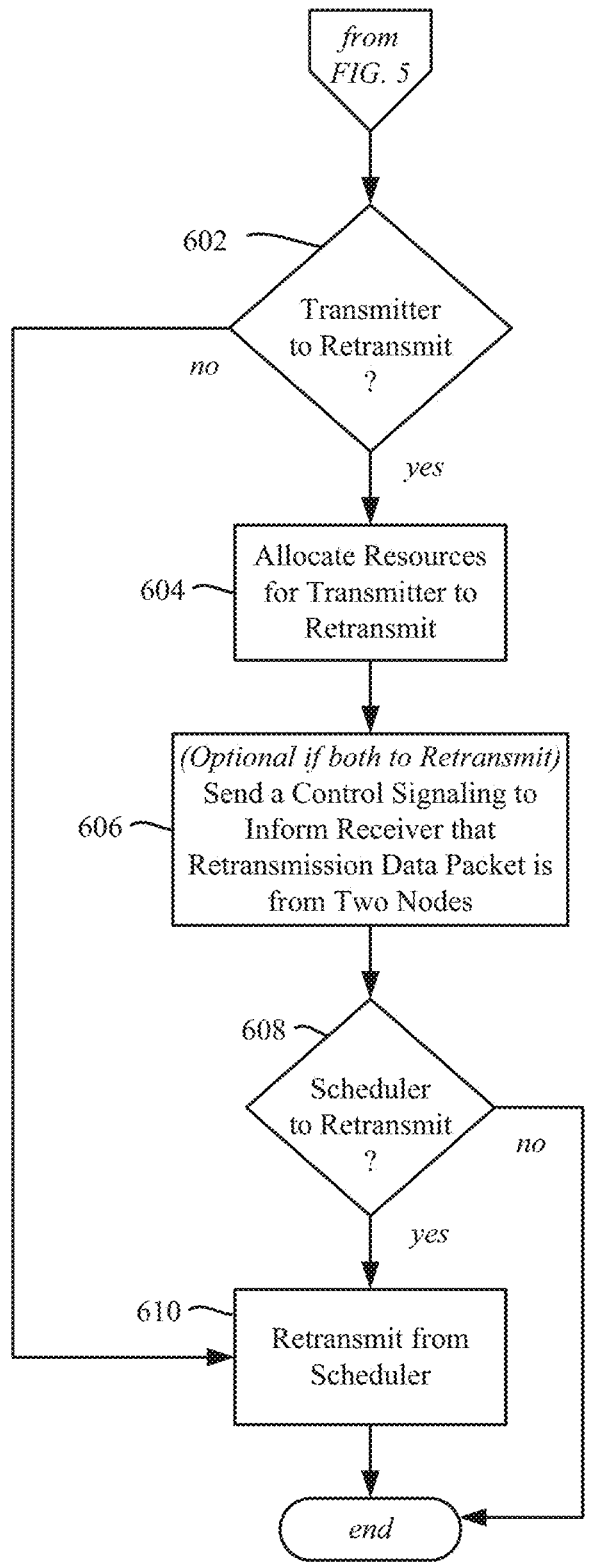

FIGS. 5 and 6 comprise a flow diagram summarizing general operations of a scheduler node using the technology described herein, beginning at operation 502 which represents the scheduler node assigning resources for a transmitter to send a new data packet. At operation 504, the scheduler node receives the data packet on the assigned resource, which is stored as represented by operation 506. As described herein, the scheduler node may or may not decode the data packet (or may decode later if retransmission with a different redundancy version is desired, instead of operating as a repeater).

At operation 508, the scheduler node receives the HARQ feedback information from the receiver. If a NAK is received, the scheduler branches to operation 602 of FIG. 6, otherwise the procedure can end, (e.g., removing the packet data from scheduler node storage and so on, as appropriate). Note that operation 510 is based on an ACK/NAK having been received at operation 508; options that can be taken if no ACK/NAK was received are described above.

In one alternative, via operation 602 the scheduler can select the transmitter to retransmit the data packet, in which event the scheduler node allocates resources for the transmitter node to retransmit, including informing the transmitter node of the resources. Otherwise, the scheduler transmits (represented via operation 610) the data packet it received at operation 504 of FIG. 5.

As described above, both the scheduler node and the transmitter node can send a retransmission, and if so, as represented via operation 606, the scheduler node may choose to inform the receiver node that the retransmission data packet is to be received from two nodes, whereby the receiver can prepare its channel estimation accordingly.

Operation 608 represents the logic of whether the scheduler node is also to send the retransmission, e.g., decided via various factors such as QoS, link quality, and so on. If so, the scheduler transmits (represented via operation 610) a copy the data packet it received at operation 504 of FIG. 5, (which may be an as is copy, or a decoded copy as described herein).

As can be seen, the technology described herein facilitates reliable HARQ for data communications in a three-party wireless communication system having a scheduling node, transmitting node and receiving node(s). The technology includes alternatives that can be selected based on current state information, QoS, and so forth.

Figure 7:
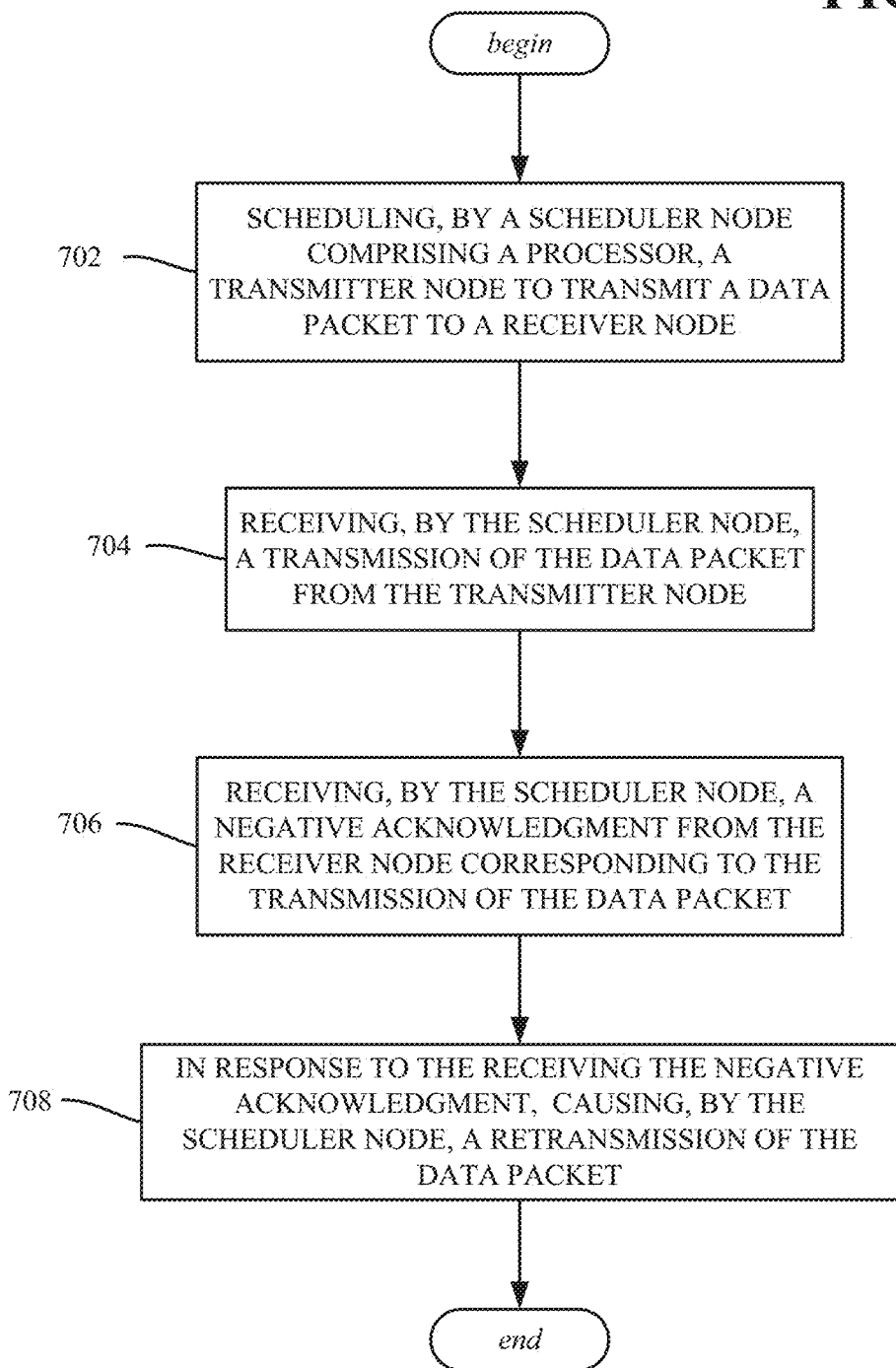
FIG. 7 illustrates example operations of a scheduler node to cause a data retransmission, in accordance with various aspects and embodiments of the subject disclosure.

One or more aspects, such as those implemented in example operations (e.g., performed by a scheduler node/local manager node device comprising a processor) of a method, are represented in FIG. 7, and are directed towards scheduling, (operation 702) by a scheduler node, a transmitter node to transmit a data packet to a receiver node. Operation 704 represents receiving, by the scheduler node, a transmission of the data packet from the transmitter node. Operation 706 represents receiving, by the scheduler node, a negative acknowledgment from the receiver node corresponding to the transmission of the data packet. Operation 706 represents, in response to the receiving the negative acknowledgment, causing, by the scheduler node, a retransmission of the data packet.

Causing the retransmission of the data packet can comprise allocating resources for the transmitter node to perform the retransmission. Causing the retransmission of the data packet can comprise the retransmission of the data packet being from the scheduler node. Causing the retransmission of the data packet can comprise allocating resources for the transmitter node to perform the retransmission, and further for the retransmission of the data packet to be from the scheduler node.

Aspects can comprise sending, by the scheduler node to the receiver node, control signal information that informs the receiver node that the retransmission of the data packet is to be performed by the transmitter node and the scheduler node.

The transmitter node can be a first transmitter node, and causing the retransmission of the data packet can comprise allocating resources for a second transmitter node to perform the retransmission. Causing the retransmission of the data packet can comprise communicating the retransmission of the data packet from the scheduler node, and allocating resources for the transmitter node to perform the retransmission at the same time or substantially the same time as the retransmission of the data packet from the scheduler node.

Causing the retransmission of the data packet can comprise determining whether to have the transmitter node perform the retransmission or whether to retransmit the data packet from the scheduler node, and, in response to determining that the transmitter node is to retransmit the data packet, allocating resources for the transmitter node to perform the retransmission, or, in response to determining that the data packet is to be retransmitted from the scheduler node, retransmitting the data packet from the scheduler node.

Causing the retransmission of the data packet can comprise determining whether to have the transmitter node perform the retransmission without the retransmission from the scheduler node or whether to retransmit the data packet from both the scheduler node and the transmitter node.

Determining whether to have the transmitter node perform the retransmission or whether to retransmit the data packet from both the scheduler node and the transmitter node can comprise evaluating quality of service information associated with the data packet. Determining whether to have the transmitter node perform the retransmission or whether to retransmit the data packet from both the scheduler node and the transmitter node can comprise evaluating signal quality information.

Aspects can comprise determining, by the scheduler node, a redundant version of a transmission block, comprising the data packet, to retransmit as part of the retransmission. Aspects can comprise determining decoding, by the scheduler node, the transmission of the data packet received from the transmitter node.

Figure 8:
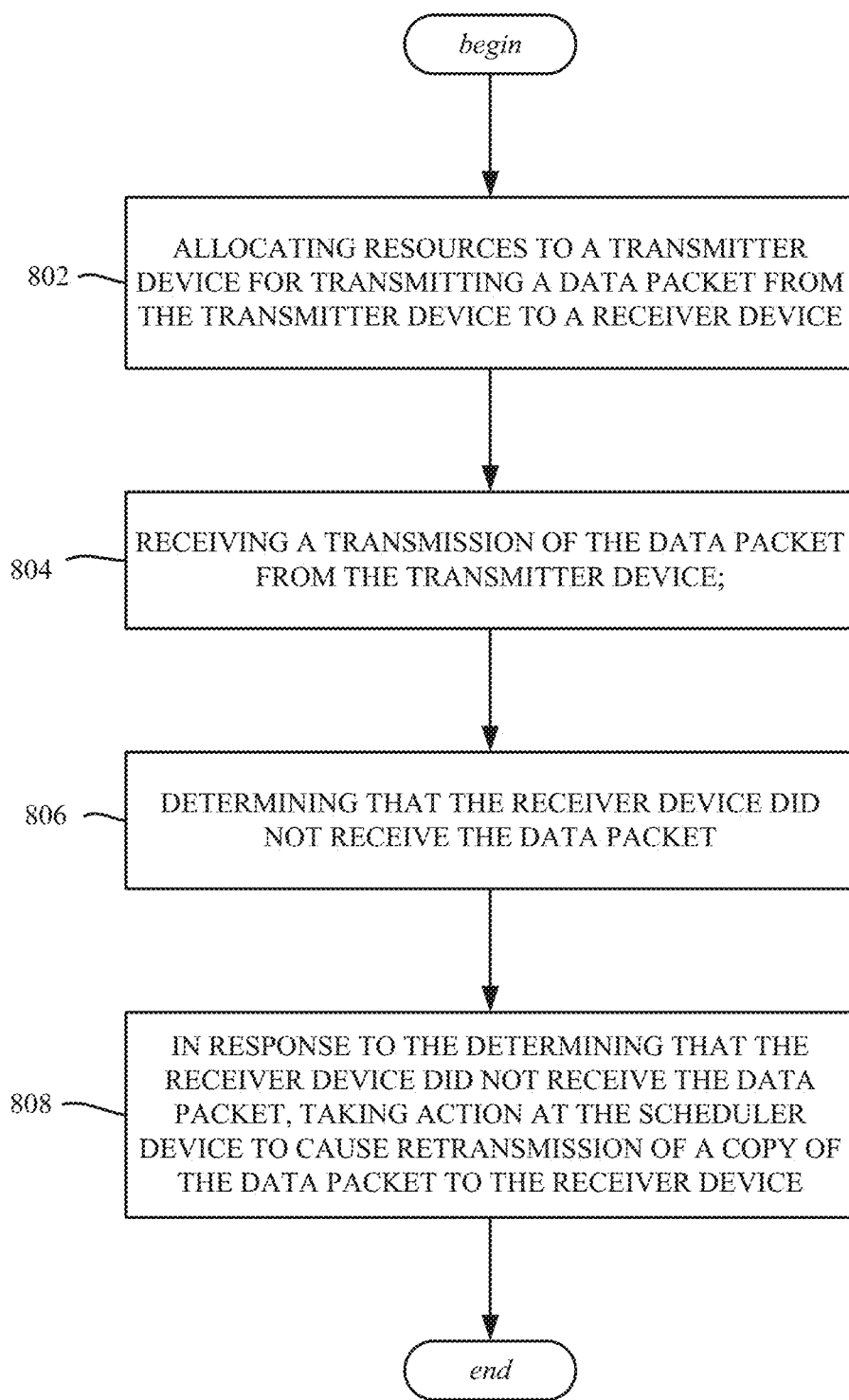
FIG. 8 illustrates example operations of a scheduler node to take action with respect to a data retransmission in response to a NAK, in accordance with various aspects and embodiments of the subject disclosure.

One or more example aspects are represented in FIG. 8, and can correspond to a scheduler node device in a wireless network, comprising a processor, and a memory that stores executable instructions that, when executed by the processor, facilitate performance of operations. Example operation 802 represents allocating resources to a transmitter device for transmitting a data packet from the transmitter device to a receiver device. Example operation 804 represents receiving a transmission of the data packet from the transmitter device. Example operation 806 represents determining that the receiver device did not receive the data packet. Example operation 808 represents, in response to the determining that the receiver device did not receive the data packet, taking action at the scheduler device to cause retransmission of a copy of the data packet to the receiver device.

Determining that the receiver device did not receive the data packet can comprise receiving a negative acknowledgment from the receiver device corresponding to the transmission of the data packet. Taking the action to cause the retransmission of the copy of the data packet can comprise retransmitting the copy of the data packet from the scheduler device.

The copy of the data packet can comprise a first copy, and the taking the action at the scheduler device to cause the retransmission of the data packet can comprise allocating resources for the transmitter device to perform the retransmission of the first copy, and further retransmitting a second copy of the data packet from the scheduler device. Further operations can comprise, sending control signal information from the scheduler device to the receiver device that informs the receiver device that the retransmission of the data packet is to be performed by the transmitter device and the scheduler device.

Figure 9:
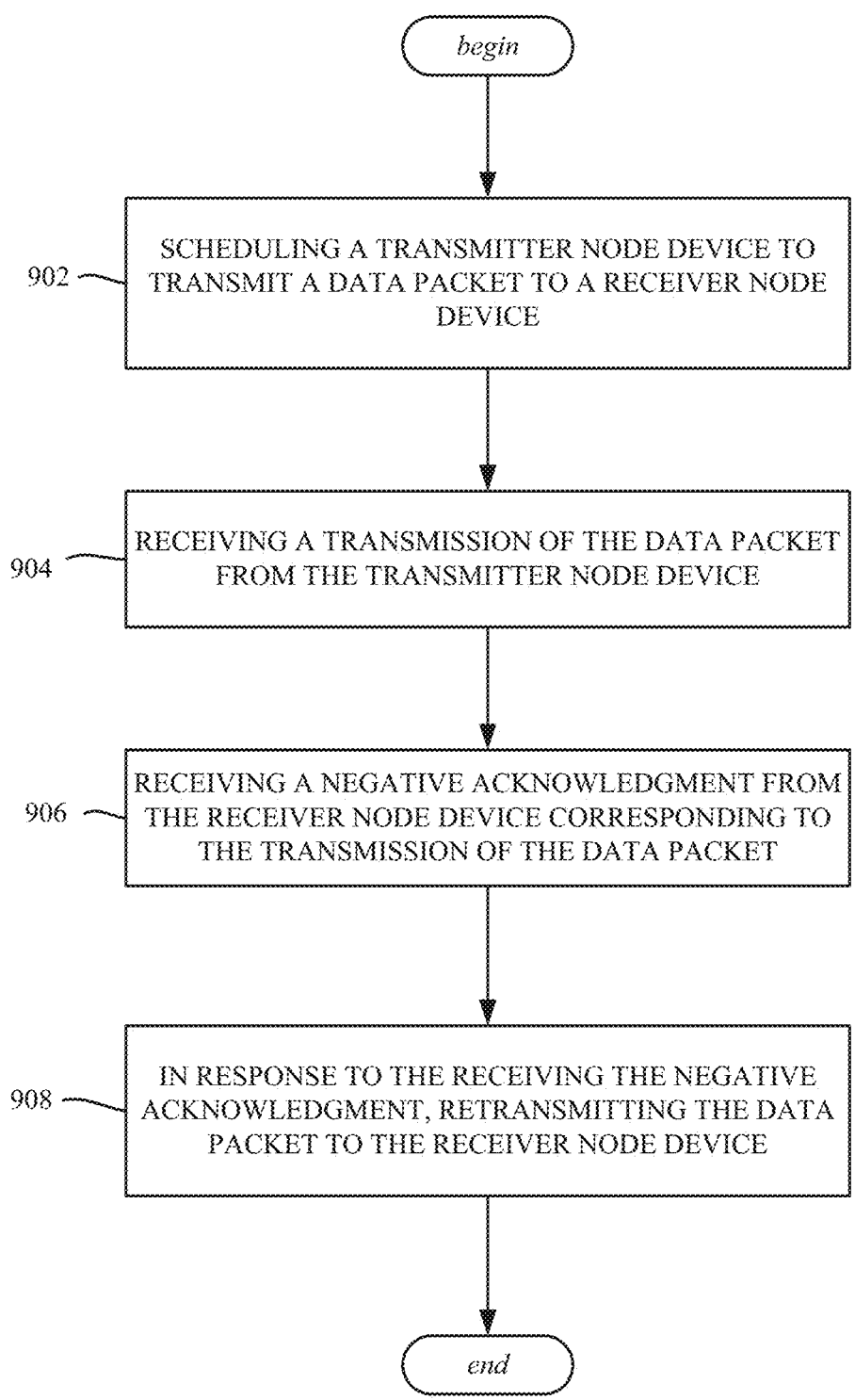
FIG. 9 illustrates example operations of a scheduler node that retransmits a data packet to a receiver node, in accordance with various aspects and embodiments of the subject disclosure.

One or more aspects, such as implemented in a machine-readable storage medium, comprising executable instructions that, when executed by a processor, facilitate performance of example operations, are represented in FIG. 9. Operation 902 represents scheduling a transmitter node device to transmit a data packet to a receiver node device.

Operation 904 represents receiving a transmission of the data packet from the transmitter node device. Operation 906 represents receiving a negative acknowledgment from the receiver node device corresponding to the transmission of the data packet. Operation 908 represents, in response to the receiving the negative acknowledgment, retransmitting the data packet to the receiver node device.

Retransmitting the data packet to the receiver node device can comprise instructing the transmitter node device to retransmit the data packet to the receiver node device. Further operations can comprise, sending control signal information to the receiver node device that informs the receiver node device that the retransmitting of the data packet is to be performed by the transmitter node device and the scheduler node device.

A wireless communication system can employ various cellular systems, technologies, and modulation schemes to facilitate wireless radio communications between devices (e.g., a UE and the network device). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network device) of the system are configured to communicate wireless signals using one or more multi carrier modulation schemes, wherein data symbols can be transmitted simultaneously over multiple frequency sub-carriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks.

Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 10:
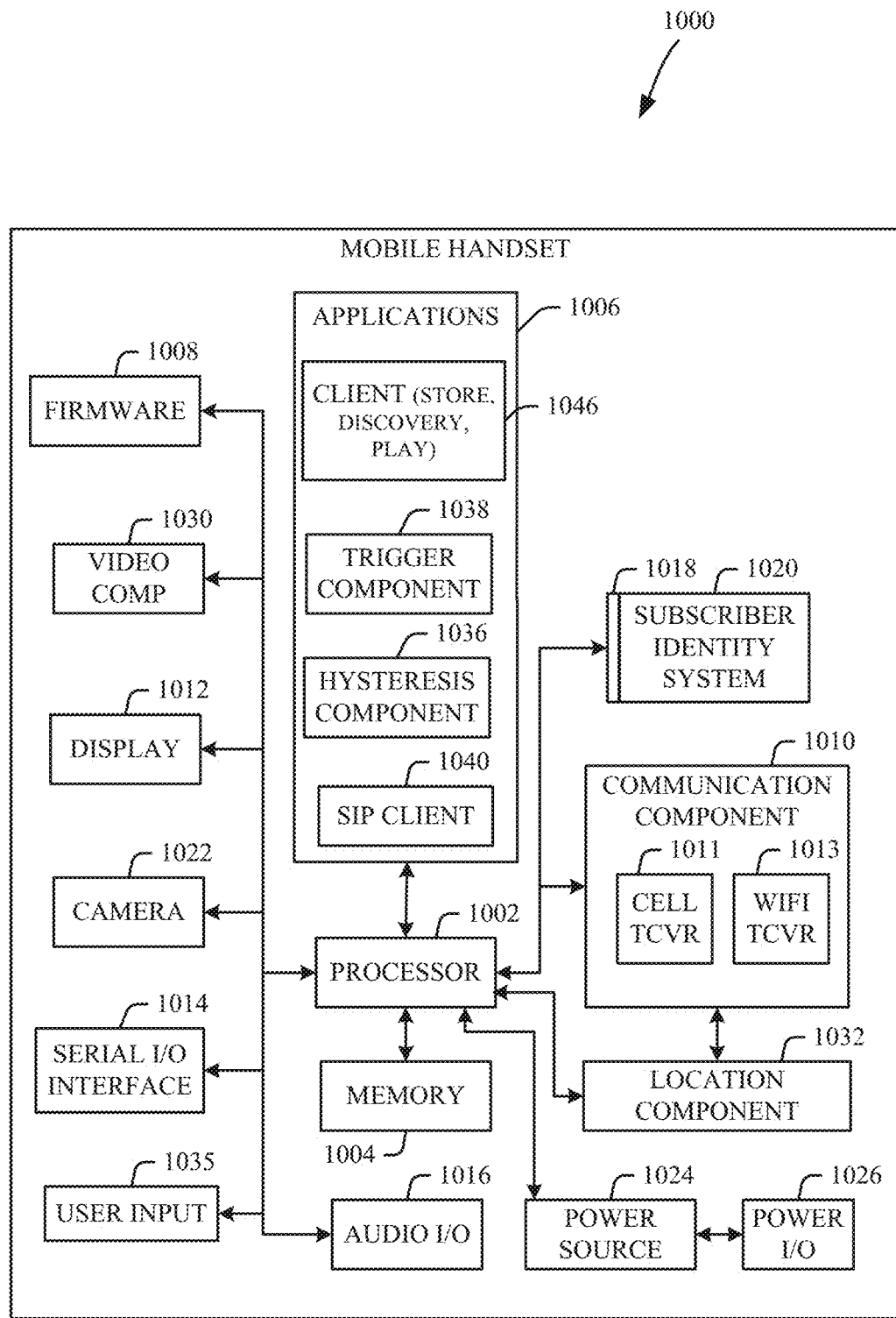
FIG. 10 illustrates an example block diagram of an example mobile handset operable to engage in a system architecture that facilitates wireless communications according to one or more embodiments described herein.

Referring now to FIG. 10, illustrated is a schematic block diagram of an example end-user device such as a user equipment) that can be a mobile device 1000 capable of connecting to a network in accordance with some embodiments described herein. Although a mobile handset 1000 is illustrated herein, it will be understood that other devices can be a mobile device, and that the mobile handset 1000 is merely illustrated to provide context for the embodiments of the various embodiments described herein. The following discussion is intended to provide a brief, general description of an example of a suitable environment 1000 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1038 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 810, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
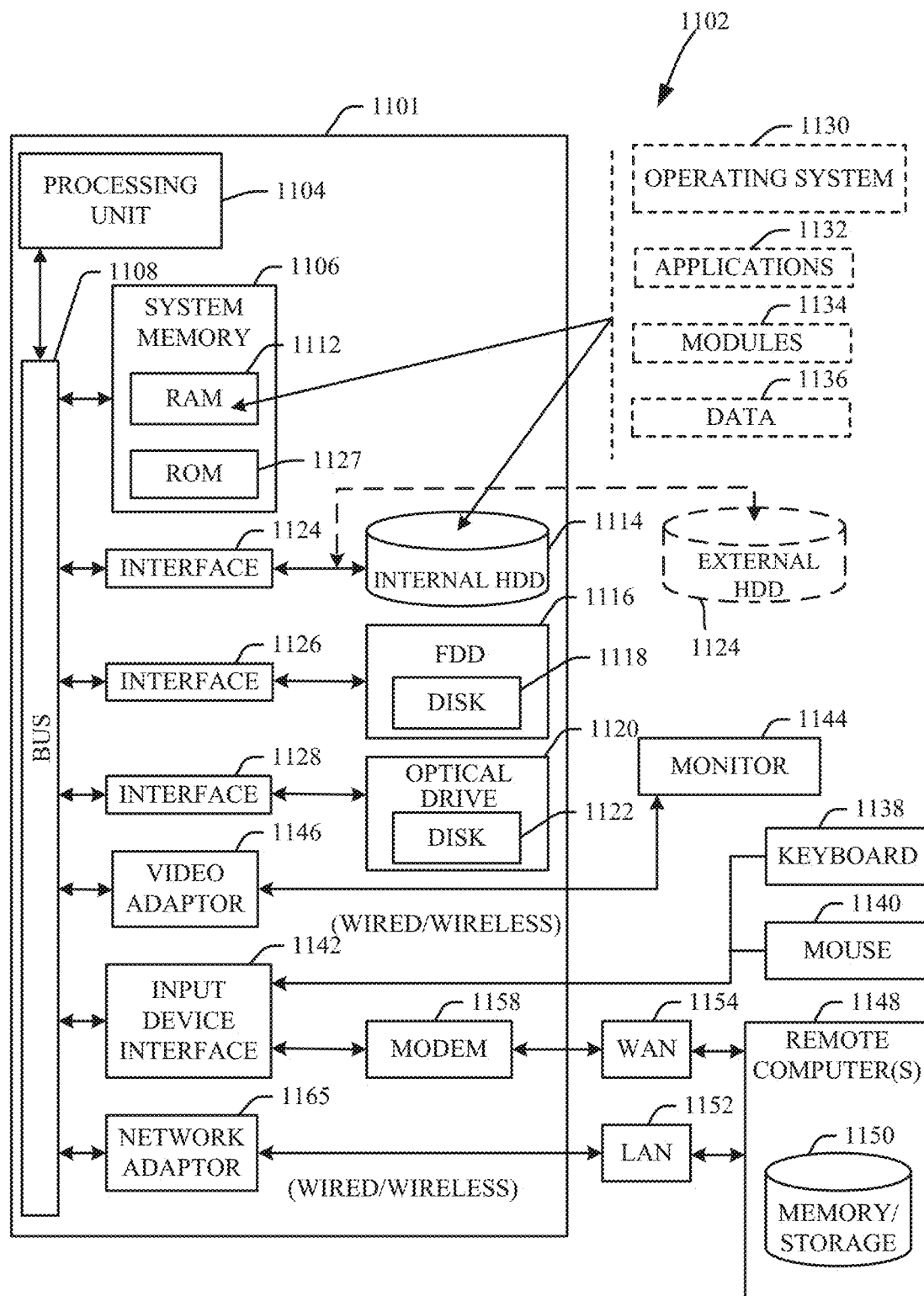
FIG. 11 illustrates an example block diagram of an example computer operable to engage in a system architecture that facilitates wireless communications according to one or more embodiments described herein.

Referring now to FIG. 11, there is illustrated a block diagram of a computer 1100 operable to execute the functions and operations performed in the described example embodiments. For example, a network node (e.g., network node 116, GNB 202, etc.) may contain components as described in FIG. 11. The computer 1100 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 11, implementing various aspects described herein with regards to the end-user device can include a computer 1100, the computer 1100 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1127 and random access memory (RAM) 1112. A basic input/output system (BIOS) is stored in a non-volatile memory 1127 such as ROM, EPROM, EEPROM, which BIOS contains the basic routines that help to transfer information between elements within the computer 1100, such as during start-up. The RAM 1112 can also include a high-speed RAM such as static RAM for caching data.

The computer 1100 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1100 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1100, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the various embodiments can be implemented with various commercially available operating systems or combinations of operating systems.

A user can enter commands and information into the computer 1100 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 through an interface, such as a video adapter 1146. In addition to the monitor 1144, a computer 1100 typically includes other peripheral output devices (not shown), such as speakers, printers, etc.

The computer 1100 can operate in a networked environment using logical connections by wired and/or wireless communications to one or more remote computers, such as a remote computer(s) 1148. The remote computer(s) 1148 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1100 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1100 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the input device interface 1142. In a networked environment, program modules depicted relative to the computer, or portions thereof, can be stored in the remote memory/storage device 1150. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 11 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
scheduling, by a scheduler node comprising a processor, a transmitter node to transmit a data packet to a receiver node;
receiving, by the scheduler node, a transmission of the data packet from the transmitter node to the receiver node;
receiving, by the scheduler node, a negative acknowledgment from the receiver node corresponding to the transmission of the data packet; and
in response to the receiving the negative acknowledgment, causing, by the scheduler node, a retransmission of the data packet to the receiver node, wherein the causing comprises:
in response to determining that the transmitter node is to retransmit the data packet, allocating resources for the transmitter node to perform the retransmission, and
in response to determining that the scheduler node is to retransmit the data packet, performing the retransmission of the data packet from the scheduler node.

2. The method of claim 1, wherein causing the retransmission of the data packet comprises allocating resources for the transmitter node to perform the retransmission as a first retransmission, and further for the retransmission of the data packet to be a second retransmission from the scheduler node.

3. The method of claim 1, further comprising, in response to determining the data packet is to be retransmitted from the transmitter node and the scheduler node, sending, by the scheduler node to the receiver node, control signal information that informs the receiver node that the retransmission of the data packet is to be performed by the transmitter node and the scheduler node.

4. The method of claim 1, wherein causing the retransmission of the data packet comprises communicating the retransmission of the data packet from the scheduler node, and allocating resources for the transmitter node to perform the retransmission at the same time or substantially the same time as the retransmission of the data packet from the scheduler node.

5. The method of claim 1, wherein the transmitter node is a first transmitter node, and wherein causing the retransmission of the data packet comprises allocating resources for a second transmitter node to perform the retransmission.

6. The method of claim 1, further comprising determining, by the scheduling node, whether to retransmit the data packet from at least one of the transmitter node or the scheduler node based on a result of evaluating quality of service information associated with the data packet.

7. The method of claim 1, further comprising determining, by the scheduling node, whether to retransmit the data packet from at least one of the transmitter node or the scheduler node based on a result of evaluating signal quality information.

8. The method of claim 1, further comprising determining, by the scheduler node, a redundant version of a transmission block, comprising the data packet, to retransmit as part of performing the retransmission.

9. The method of claim 1, further comprising decoding, by the scheduler node, the transmission of the data packet received from the transmitter node.

10. Network scheduling equipment, comprising:
a processor; and
a memory that stores executable instructions that, when executed by the processor, facilitate performance of operations, the operations comprising:
allocating resources to a transmitter device for transmitting a data packet from the transmitter device to a receiver device;
receiving a transmission of the data packet from the transmitter device to the receiver device;
determining that the receiver device did not receive the data packet; and
in response to the determining that the receiver device did not receive the data packet, taking action at the network scheduling equipment to cause retransmission of a copy of the data packet to the receiver device, wherein the taking action comprises:
in response to determining that the transmitter device is to retransmit the data packet, allocating resources for the transmitter device to perform the retransmission, and
in response to determining that the network scheduling equipment is to retransmit the data packet, performing the retransmission of the data packet from the network scheduling equipment.

11. The network scheduling equipment of claim 10, wherein the determining that the receiver device did not receive the data packet comprises receiving a negative acknowledgment from the receiver device corresponding to the transmission of the data packet.

12. The network scheduling equipment of claim 10, wherein the operations further comprise, in response to determining to retransmit the data packet from the transmitter device and the network scheduling equipment, sending control signal information from the network scheduling equipment to the receiver device that informs the receiver device that the retransmission of the data packet is to be performed by the transmitter device and the network scheduling equipment.

13. The network scheduling equipment of claim 10, wherein the operations further comprise determining whether to retransmit the data packet from at least one of the transmitter device or the network scheduling equipment based on evaluating quality of service information associated with the data packet.

14. The network scheduling equipment of claim 10, wherein the operations further comprise determining whether to retransmit the data packet from at least one of the transmitter device or the network scheduling equipment based on evaluating signal quality information.

15. The network scheduling equipment of claim 10, wherein the operations further comprise determining a redundant version of a transmission block, comprising the data packet, to retransmit as part of the retransmission.

16. The network scheduling equipment of claim 10, wherein the operations further comprise decoding, by the network scheduler equipment, the transmission of the data packet received from the transmitter device.

17. A non-transitory machine-readable medium, comprising executable instructions that, when executed by a processor of a scheduler user equipment, facilitate performance of operations, the operations comprising:
- scheduling a transmitter user equipment to transmit a data packet to a receiver user equipment;
- receiving a transmission of the data packet from the transmitter user equipment to the receiver user equipment;
- receiving a negative acknowledgment from the receiver user equipment corresponding to the transmission of the data packet; and
- in response to the receiving the negative acknowledgment, causing retransmitting of the data packet to the receiver user equipment, wherein the causing comprises:
  - in response to determining that the transmitter user equipment is to retransmit the data packet, allocating resources for the transmitter user equipment to perform the retransmission, and
  - in response to determining that the scheduler user equipment is to retransmit the data packet, retransmitting the data packet from the scheduler user equipment.

18. The non-transitory machine-readable medium of claim 17, wherein the operations further comprise, in response to determining to retransmit the data packet from the transmitter user equipment and the scheduler user equipment, sending control signal information to the receiver user equipment that informs the receiver user equipment that the retransmitting of the data packet is to be performed by the transmitter user equipment and the scheduler user equipment.

19. The non-transitory machine-readable medium of claim 17, wherein the operations further comprise determining whether to retransmit the data packet from at least one of the transmitter user equipment or the scheduler user equipment based on evaluating quality of service information associated with the data packet.

20. The non-transitory machine-readable medium of claim 17, wherein the operations further comprise determining whether to retransmit the data packet from at least one of the transmitter user equipment or the scheduler user equipment based on evaluating signal quality information.

* * * * *